United States Patent
Sun et al.

(10) Patent No.: US 8,372,552 B2
(45) Date of Patent: Feb. 12, 2013

(54) METHOD OF REMOVING RESIDUAL OXYGEN IN FUEL CELL BY ELECTROCHEMICAL PURGING

(75) Inventors: Hee-young Sun, Yongin-si (KR); Duk-jin Oh, Seoul (KR); Tae-won Song, Yongin-si (KR)

(73) Assignees: Samsung Electronics Co., Ltd., Suwon-si, Gyeonggi-do (KR); Samsung SDI Co., Ltd., Suwon-wi, Gyeonggi-do (KR)

( * ) Notice: Subject to any disclaimer, the term of this patent is extended or adjusted under 35 U.S.C. 154(b) by 326 days.

(21) Appl. No.: 12/622,600

(22) Filed: Nov. 20, 2009

(65) Prior Publication Data

US 2010/0151289 A1     Jun. 17, 2010

(30) Foreign Application Priority Data

Dec. 16, 2008    (KR) ........................ 10-2008-0128182

(51) Int. Cl.
*H01M 8/04* (2006.01)
(52) U.S. Cl. ........ 429/429; 429/443; 429/444; 429/446; 429/452
(58) Field of Classification Search .................. 429/443, 429/444, 446, 408, 414, 412, 428, 432, 431, 429/427, 429, 452
See application file for complete search history.

(56) References Cited

U.S. PATENT DOCUMENTS

| 7,232,622 | B2 * | 6/2007 | Kim ............................ 429/434 |
| 2003/0129462 | A1 | 7/2003 | Yang et al. |
| 2004/0001980 | A1 | 1/2004 | Balliet |
| 2005/0221148 | A1 | 10/2005 | Goebel |
| 2009/0110971 | A1 * | 4/2009 | Nishimura et al. ............. 429/13 |
| 2009/0148730 | A1 | 6/2009 | Chizawa et al. |

FOREIGN PATENT DOCUMENTS

| JP | 09-298065 | 11/1997 |
| JP | 2003-217631 A | 7/2003 |
| JP | 2005-515603 | 5/2005 |
| JP | 2005-531123 | 10/2005 |
| KR | 10-2007-0085778 A | 8/2007 |

* cited by examiner

*Primary Examiner* — Raymond Alejandro
(74) *Attorney, Agent, or Firm* — Lee & Morse, P.C.

(57) ABSTRACT

A method of removing residual oxygen in a residential high temperature non-humidification fuel cell stack including at least one cathode. The method includes making the pressure in the cathode higher than that outside of the cathode and maintaining airtight sealing of the cathode of the fuel cell stack, removing the residual oxygen in the fuel cell stack, and stopping supplying of fuel to the fuel cell stack. The setting of the pressure includes blocking air flow out of the cathode, comparing the pressure in the cathode with a set pressure higher than the pressure outside the cathode, and supplying air to the cathode until the pressure in the cathode is the same as or is higher than the set pressure.

20 Claims, 8 Drawing Sheets

METHOD OF REMOVING RESIDUAL OXYGEN IN FUEL CELL BY ELECTROCHEMICAL PURGING

CROSS-REFERENCE TO RELATED APPLICATION

This application claims the benefit of Korean Patent Application No. 10-2008-0128182, filed Dec. 16, 2008 in the Korean Intellectual Property Office, the disclosure of which is incorporated herein by reference.

BACKGROUND

1. Field of the Invention

One or more embodiments relate to a method of operating a fuel cell, and more particularly, to a method of removing residual oxygen from a stack of a residential high temperature non-humidification fuel cell.

2. Description of the Related Art

Residential fuel cell systems are, in general, operated in daily start-up and shut-down (DSS) cycles. When a residential fuel cell system is stopped or shut down, nitrogen purging is used to reduce the cell voltage below a predetermined level in order to prevent corrosion of the carbon support of a cathode or cathodes because of the excessive voltage.

Nitrogen purging needs a nitrogen bomb and an additional pipe and valve. Thus, the size and number of components of residential fuel cell systems increase. However, nitrogen purging makes it difficult to remove residual oxygen in the micro-pores of an electrode. Thus, after nitrogen purging is completed, the residual oxygen may continue to cause corrosion of carbon.

When residential fuel cell systems are temporarily stopped, that is, when residential fuel cell systems are in an idle mode, the residual oxygen may be removed from a fuel cell stack by nitrogen purging (substitution by nitrogen). In addition, the residual oxygen is removed from the fuel cell stack by using two methods: by charging a cathode with hydrogen created by the electrolysis of water and sealing the cathode, and by interrupting air supply into the fuel cell and removing the residual oxygen by using a constant current.

The first method may increase the removal rate with respect to the residual oxygen. However, the first method may not be easily applied to a high temperature non-humidification fuel cell system (a fuel cell that operates at a high temperature under non-humid conditions), may lead to hydrogen leakage and may lead to oxygen being supplied into the fuel cell again.

The second method may produce a negative pressure lower than atmospheric pressure inside the cathode due to a reduction of partial pressure caused by the removing of the residual oxygen, which may lead to air being supplied into the fuel cell from outside. Furthermore, a side reaction may occur due to a local concentration of current density.

SUMMARY

One or more embodiments include a method of removing residual oxygen in a high temperature non-humidification fuel cell by electrochemical purging by which the residual oxygen in minute pores of an electrode of a fuel cell stack is removed while a negative pressure is not caused in the fuel cell stack.

One or more embodiments include a method of removing residual oxygen in a high temperature non-humidification fuel cell by maintaining airtight sealing of a fuel cell stack comprising at least one cathode by making the pressure of the cathode higher than outside of the cathode, removing residual oxygen in the fuel cell stack, and stopping the supply of fuel into the fuel cell stack.

To achieve the above and/or other aspects, one or more embodiments may include a method of removing residual oxygen from a fuel cell stack, the method including: making the pressure in a cathode higher than that outside of the cathode and maintaining airtight sealing of the cathode of the fuel cell stack; removing the residual oxygen in the fuel cell stack; and stopping the supply of fuel into the fuel cell stack.

The making of the pressure may include: blocking air flow out of the cathode; comparing the pressure in the cathode with a set pressure higher than the pressure outside the cathode; and supplying air to the cathode until the pressure in the cathode is the same as or is higher than the set pressure.

The blocking of the air flow may include: shutting off an inlet valve of the cathode. The method may further include: when the pressure in the cathode is the same as or is higher than the set pressure, shutting off the inlet valve of the cathode; and stopping the supply of air to the fuel cell stack.

The removing of the residual oxygen in the fuel cell stack may include: applying a voltage to the fuel cell stack; measuring the current value in the fuel cell stack to which the voltage is applied; comparing the measured current value with a set current value; and applying the voltage to the fuel cell stack until the measured current value is the same as or is less than the set current value.

The method may further include: after applying the voltage to the fuel cell stack until the measured current value is less than the set current value, comparing the voltage applied to the fuel cell stack with a set voltage; and adjusting the voltage applied to the fuel cell stack until the voltage applied to the fuel cell stack is the same as or is less than the set voltage. The application of the voltage to the fuel cell stack may be stopped when the voltage applied to the fuel cell stack is the same as or is less than the set voltage.

The method may further include: when the adjusted voltage is the same as or is less than the set voltage, adjusting the set current value; comparing the measured current value with the adjusted set current value (hereinafter, referred to as a second set current value); and when the measured current value is the same as or is less than the second set current value, stopping the application of the voltage to the fuel cell stack. The second set current value may be less than the set current value before being adjusted. When the adjusted voltage is the same as or is less than the set voltage, the adjusted voltage may be applied to the fuel cell stack longer than a different voltage applied to the fuel cell stack.

The stopping of supplying fuel into the fuel cell stack comprising at least one anode may include shutting off inlet and outlet valves of the anode. Before the residual oxygen is removed, the pressure in the cathode of the fuel cell stack may be higher than the ordinary pressure after the removing of the residual oxygen is completed. Before the residual oxygen is removed, the pressure in the cathode of the fuel cell stack may be maintained between about 1.27 and about 2 atm.

The removing of the residual oxygen in the fuel cell stack may further include: connecting the fuel cell stack to a load and applying a current to the load; measuring the voltage of the fuel cell stack; comparing the measured voltage with the set voltage; and stopping applying the current to the load when the measured voltage is the same as or is less than the set voltage.

The method may further include: after stopping applying the current to the load, measuring the voltage of the fuel cell stack again; comparing the measured voltage (hereinafter, referred to as a second measured voltage) with the set voltage; and when the second measured voltage is greater than the set voltage, removing the residual oxygen by applying the voltage to the fuel cell stack. The current may be a pulsating current. The voltage may be applied by using a DC-DC converter.

The removing of the residual oxygen by applying the voltage to the fuel cell stack may include: applying a voltage to the fuel cell stack; measuring a current of the fuel cell stack according to the voltage application; comparing the measured current value with a set current value; and applying the voltage to the fuel cell stack until the measured current value is the same as or is less than the set current value.

The method may further include: after applying the voltage to the fuel cell stack until the measured current value is the same as or is less than the set current value, comparing the voltage applied to the stack with the set voltage; and adjusting the voltage applied the fuel cell stack until the voltage applied to the stack is the same as or is less than the set voltage. The application of the current to the load may be stopped before the measured voltage reaches the set voltage, and the residual oxygen is removed by applying the voltage to the fuel cell stack.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION

Figure 1:
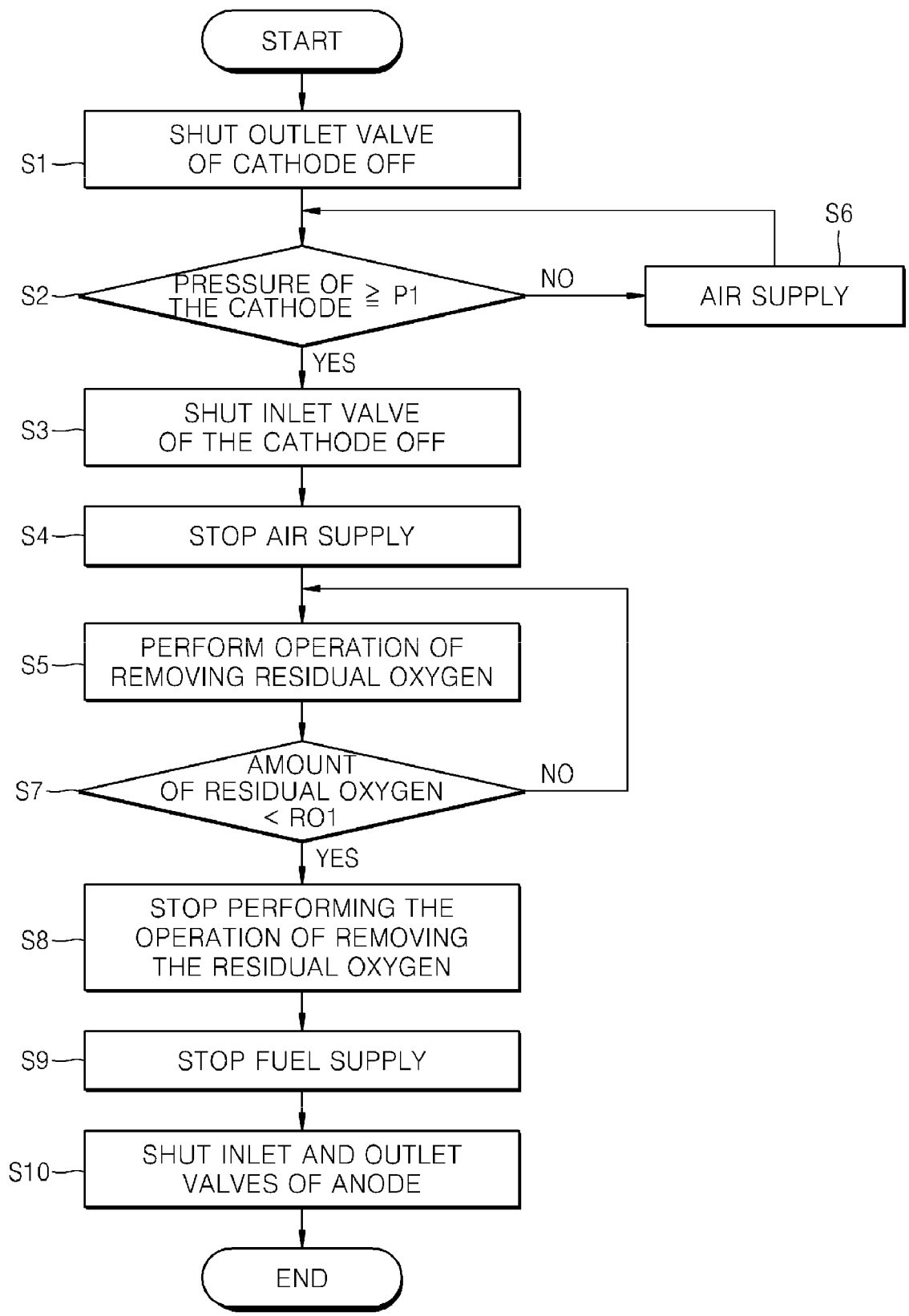
FIGS. 1 through 4 are flowcharts illustrating methods of removing residual oxygen in a fuel cell according to embodiments of the inventive concept.

Reference will now be made in detail to the embodiments of the present invention, examples of which are illustrated in the accompanying drawings, wherein like reference numerals refer to the like elements throughout. The embodiments are described below by referring to the figures.

FIG. 1 is a flowchart illustrating a method of removing residual oxygen in a fuel cell according to an embodiment of the inventive concept. Referring to FIG. 1, in operation S1, the outlet valve of a cathode is shut off after the fuel cell stops a power generation operation. The fuel cell may stop the power generation operation for various reasons. In operation S2, the pressure in the cathode is compared to a set pressure P1. The set pressure P1 may be determined in such a way that the pressure in the cathode is an ordinary pressure after residual oxygen is completely removed. The set pressure P1, which is the inner pressure of the fuel cell stack comprising at least one cathode, may be higher than the pressure outside of the cathode. For example, if the pressure outside of the cathode is at atmospheric pressure, the set pressure P1 may be higher than the atmospheric pressure. The set pressure P1 may be, for example, between about 1.27 and about 2 atm.

If the pressure in the cathode is the same as the set pressure P1 or is higher than the set pressure P1 (yes), the method proceeds to operation S3, wherein the inlet valve of the cathode is shut off. Thereafter, in operation S4, the air supply is stopped in order to interrupt the supply of air into the cathode. Alternatively, if the pressure in the cathode is maintained at the set pressure P1, operation S4 may be performed before operation S3 is performed.

While a pressure gauge could be used, according to an aspect of the invention, a pressure gauge may be omitted so as to simplify building and controlling of a fuel cell system. In this aspect, the method of controlling the pressure in the cathode will be described below. Since the amount of air supply into the cathode through the inlet valve of the cathode may be controlled, calculation of the volume of the airtight space of a cathode of the fuel cell stack between an inlet and outlet of the cathode makes it possible to determine time taken for the pressure in the cathode to reach the set pressure P1. The pressure in the cathode may be controlled to reach the set pressure P1 by closing the outlet of the cathode, supplying air into the cathode during the time to reach the set pressure P1, and then closing the inlet of the cathode. The pressure in the cathode can reach the set pressure P1 without a pressure gauge, thereby reducing the number of components and size of the fuel cell system. When a predetermined period of time elapses after the outlet in the cathode has been closed, the pressure in the cathode may be maintained at the desired pressure by merely closing the inlet of the cathode, thereby easily controlling the pressure in the cathode.

At this point, in operation S5, an operation for removing residual oxygen in the fuel cell stack is performed. Since operation S5 is performed when the pressure in the cathode is higher than the set pressure P1, a negative pressure is not created. The negative pressure that could occur when the pressure inside the stack is below atmospheric pressure due to the removal of the residual oxygen. Thus, as long as the fuel cell stack is stopped, air is not supplied from outside the fuel cell stack during operation S5, thereby increasing efficiency in removing the residual oxygen and preventing deterioration of the fuel cell stack due to the air supply. In operation S5, the current may be measured in order to determine the amount of residual oxygen in the fuel cell stack.

However, if the pressure in the cathode is lower than the set pressure P1 (no) in operation S2, the method proceeds to operation S6, wherein the air supply is continued, and operation S2 is repeated until the pressure is at least P1.

After operation S5 is performed, in operation S7, the amount of the residual oxygen in the fuel cell stack is compared to a set amount R01 of residual oxygen. The set amount R01 of residual oxygen may be the amount of oxygen residual in the fuel cell stack corresponding to a set current value. For example, when the set current value is 50 mA or 10 mA, the set amount R01 of residual oxygen may be considered as the amount of residual oxygen in the fuel cell stack corresponding to a current value of 50 mA or 10 mA measured in operation S5.

If the amount of the residual oxygen in the fuel cell stack is less than the set amount R01 of residual oxygen (yes), the method proceeds to operation S8, wherein the operation of removing the residual oxygen in the fuel cell stack is stopped.

Thereafter, in operation S9, the fuel supply is stopped, and in operation S10, the inlet and outlet valves of an anode of the fuel stack are shut off. Alternatively, operation S10 may be performed before operation S9 is performed. However, if the amount of the residual oxygen in the fuel cell stack is greater than the set amount R01 of residual oxygen (no) in operation S7, operation S5 is continued.

Figure 2:
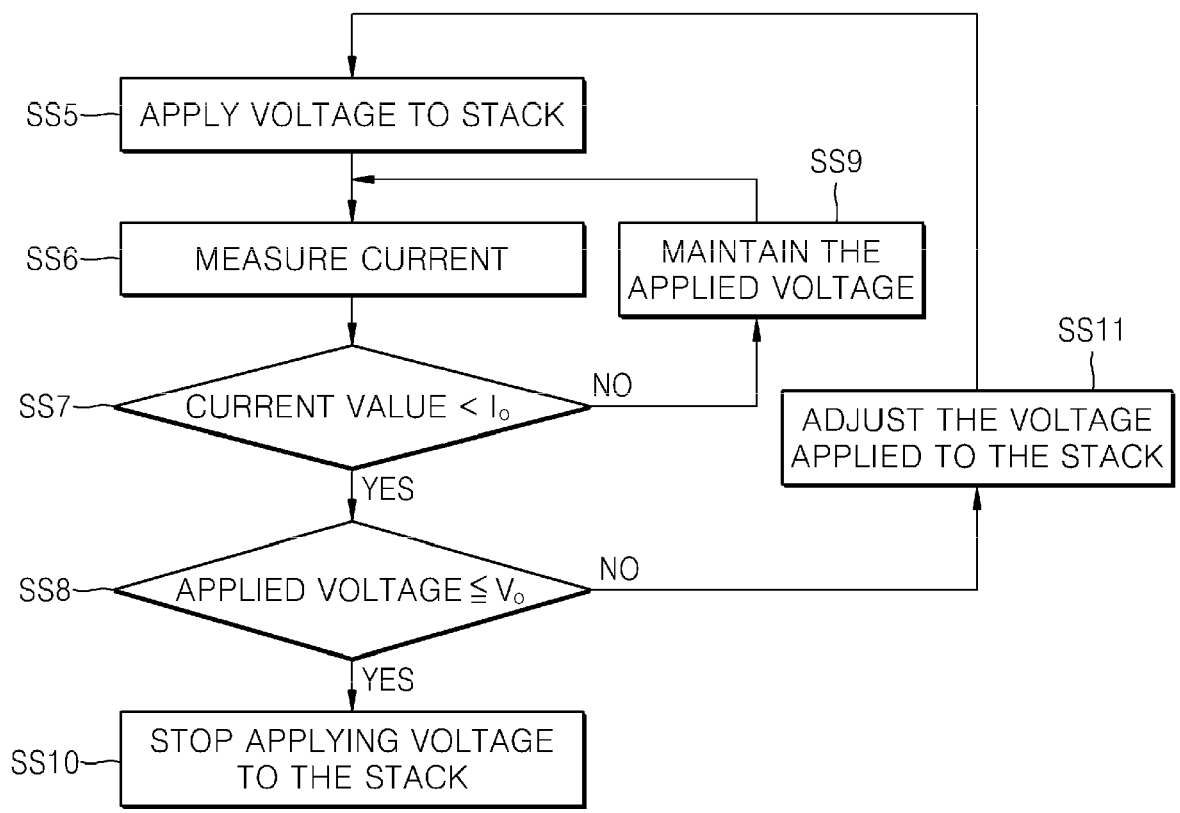

Operations S5, S7, and S8 will now be described in more detail with reference to FIGS. 2 through 4. FIG. 2 is a flowchart illustrating operations S5, S7, and S8 as illustrated in FIG. 1 according to an embodiment of the inventive concept. As shown in FIG. 2, in operation SS5, a voltage is applied to the fuel cell stack. In this regard, the voltage may be applied by using a predetermined voltage source, e.g., a DC-DC converter of a fuel cell system. The voltage is considered to be influenced by the diffusion resistance caused by variations in oxygen density around a platinum catalyst on carbon support in the fuel cell stack during the removal of the residual resident oxygen. In operation SS6, the voltage generated by the fuel cell stack is measured while operation SS5 is performed. In operation SS7, the current is measured and is compared to a set current value Io. If the measured current value is less than the set current value Io (yes), the method proceeds to operation SS8, wherein the voltage applied to the fuel cell stack is compared to a set voltage Vo. In this regard, the set voltage Vo may be, for example, 0.4 V. If the measured current value is greater than the set current value Io (no), the method proceeds to in operation SS9, wherein the voltage applied to the fuel cell stack is maintained, and operation SS6 is repeated. During operation SS8, if the voltage applied to the fuel cell stack is the same as or is less than the set voltage Vo (yes), the method proceeds to operation SS10, wherein the application of the voltage to the fuel cell stack is stopped. However, if the voltage applied to the fuel cell stack is greater than the set voltage Vo (no) in operation SS8, the method proceeds to operation SS11, wherein the voltage applied to the fuel cell stack is adjusted. Thereafter, the voltage applied to the fuel cell stack in operation SS5 is the voltage adjusted in operation SS11. During operation SS11, the voltage is adjusted to be closer to the set voltage Vo. For example, when a voltage of 0.9 V is applied to the fuel cell stack during operation SS5, the voltage may be adjusted to be less than 0.9 V during operation SS11. For example, the voltage may be adjusted to 0.8 V, that is, less than 0.9 V by 0.1 V. After operation SS10 is performed, operations S9 and S10 illustrated in FIG. 1 are performed.

Figure 3:
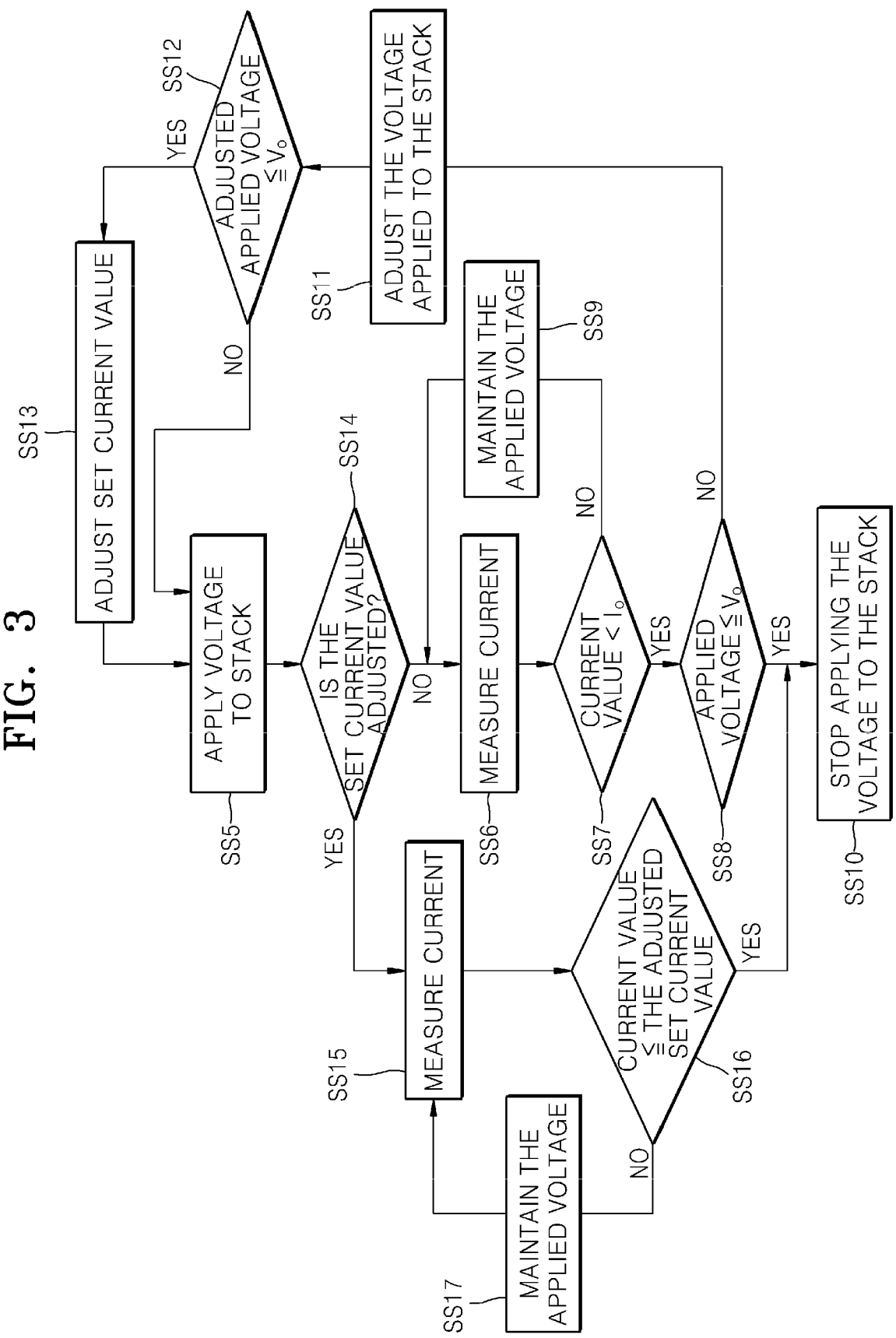

FIG. 3 is a flowchart illustrating operations S5, S7, and S8 illustrated in FIG. 1 according to another embodiment of the inventive concept. The flowchart illustrated in FIG. 3 is a partial modification of the flowchart illustrated in FIG. 2. Thus, differences between the flowcharts illustrated in FIGS. 2 and 3 will be described with reference to FIG. 3. Referring to FIG. 3, after operation SS11 is performed, in operation SS12, the adjusted voltage is compared to the set voltage Vo. If the adjusted voltage is greater than the set voltage Vo (no) in operation SS12, the subsequent operations may be the same as shown in FIG. 2.

However, if the adjusted voltage is the same as or is less than the set voltage Vo (yes) in operation SS12, the method proceeds to operation SS13, wherein the set current value is adjusted. The adjusted set current value is less than the set current voltage Io. For example, when the set current voltage Io is 50 mA, the adjusted set current value may be less than 50 mA, for example, 10 mA. Thereafter, operation SS5 is performed. In operation SS14, it is determined whether the set current value has been adjusted. If the set current value has not been adjusted (no), the subsequent operations may be the same as shown in FIG. 2.

However, if the set current value has been adjusted (yes), the method proceeds to operation SS15, wherein the current is measured from the stack to which a voltage the same as or less than the set voltage Vo is applied. In operation SS16, the measured current value in operation SS15 is compared to the adjusted set current value. If the measured current value is the same as or is less than the adjusted set current value (yes), operation SS10 is performed. However, if the measured current value in operation SS15 is greater than the adjusted set current value (no), the method proceeds to operation SS17, wherein the voltage applied to the fuel cell stack is maintained, and operation SS15 is performed.

When the voltage applied to the fuel cell stack in operation SS5 illustrated in FIGS. 2 and 3 is a constant voltage, the voltage may be applied in an on/off pulsating waveform. In this way, the residual oxygen in the fuel cell stack is more quickly removed, and the removal efficiency of the residual oxygen is increased.

Figure 4:
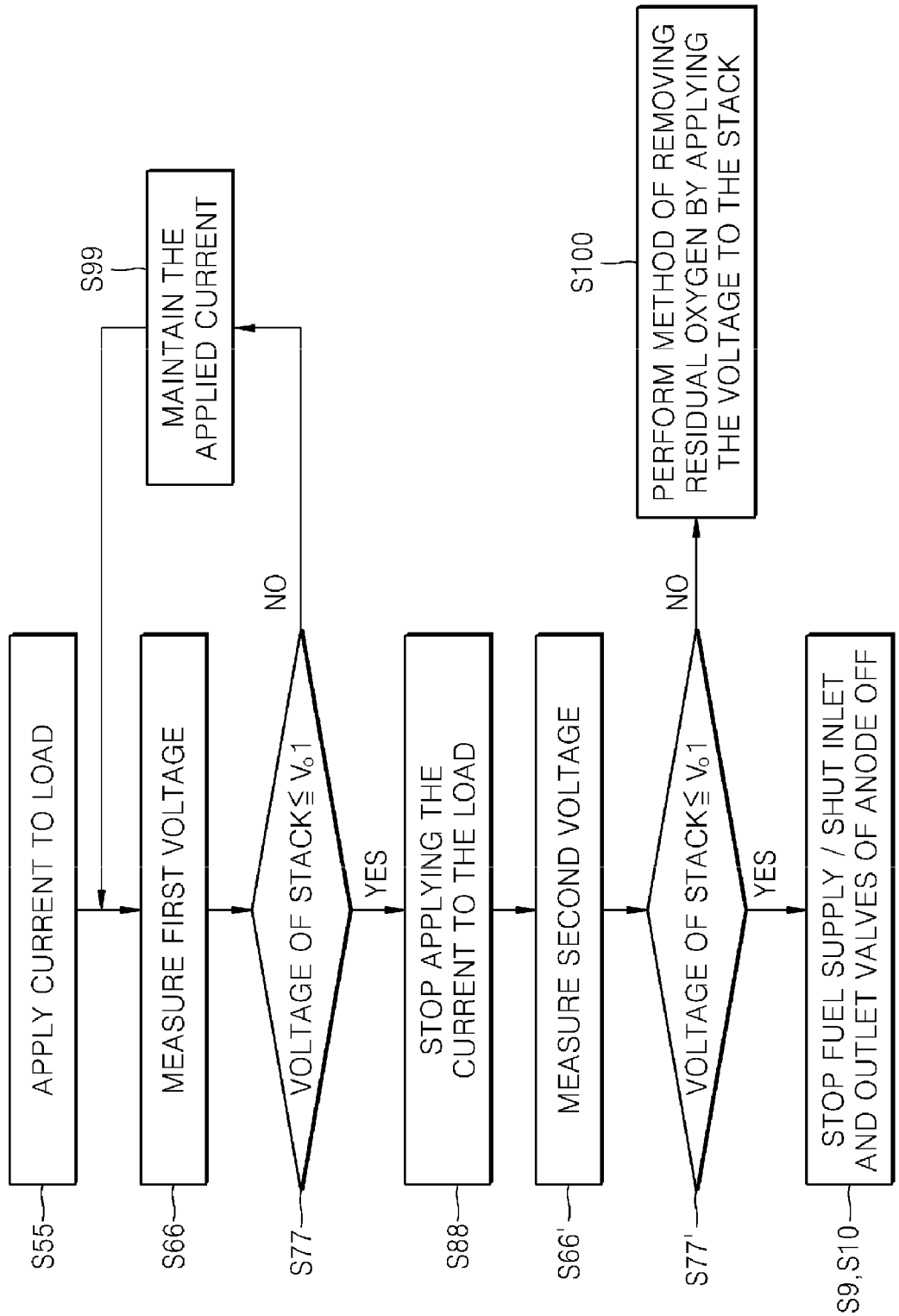

FIG. 4 is a flowchart illustrating operations S5, S7, and S8 illustrated in FIG. 1 according to another embodiment of the inventive concept. The flowchart illustrated in FIG. 4 includes an operation of removing the residual oxygen by applying a current, whereas the flowcharts illustrated in FIGS. 2 and 3 include the operation of applying a voltage.

Referring to FIG. 4, in operation S55, a current is applied to a load. In this regard, the current, which is generated by the reaction involving fuel supplied to the fuel cell stack and the residual oxygen in the fuel cell stack, is applied to an external load connected to the fuel cell stack. As a result, the residual oxygen is removed from the fuel cell stack in an idle mode. The external load may be, for example, a DC-DC converter. While operation S55 is performed, in operation S66, the voltage of the fuel cell stack is first measured. In operation S77, the first measured voltage is compared to a set voltage Vo1. If the first measured voltage is less than the set voltage Vo1 (yes), the method proceeds to operation S88, wherein the application of the current to the load is stopped. However, if the first measured voltage is greater than the set voltage Vo1 (no), the method proceeds to operation S99, wherein the application of the current to the load is maintained, and operation S66 is performed again. The set voltage Vo1 may be 0.4 V.

After operation S88 is performed, in operation S66' the voltage of the fuel cell stack is measured for a second time. In operation S77', the second measured voltage is compared to the set voltage Vo1. If the second measured voltage is the same as or is less than the set voltage Vo1 (yes), operations S9 and S10 illustrated in FIG. 1 are performed. If the second measured voltage is greater than the set voltage Vo1 (no), the subsequent operations may be the same as shown in FIG. 2 or 3.

The method of removing the residual oxygen resident in the fuel cell stack by applying the voltage to the fuel cell stack shown in FIG. 2 or 3 may be performed before the first measured voltage reaches the set voltage Vo1 in the operations shown in FIG. 4. In more detail, while the residual oxygen in the fuel cell stack is removed by applying the current to the load, before the first measured voltage reaches the set voltage Vo1, the application of the current to the load is stopped. Thereafter, the residual oxygen in the fuel cell stack may be removed by applying the voltage to the fuel cell stack shown in FIG. 2 or 3 until the first measured voltage reaches the set voltage Vo1.

FIGS. 5 through 8 are graphs showing voltage and current variations with respect to time when residual oxygen in a fuel cell stack was removed by using a method (hereinafter, referred to as the method of the inventive concept) of removing the residual oxygen resident in the fuel cell stack according to an embodiment of the inventive concept. Referring to FIGS. 5 through 8, a third or comparative curve 46 shows voltage variations of the fuel cell stack with respect to time when the residual oxygen in the fuel cell stack was removed by conventional nitrogen purging.

Figure 5:
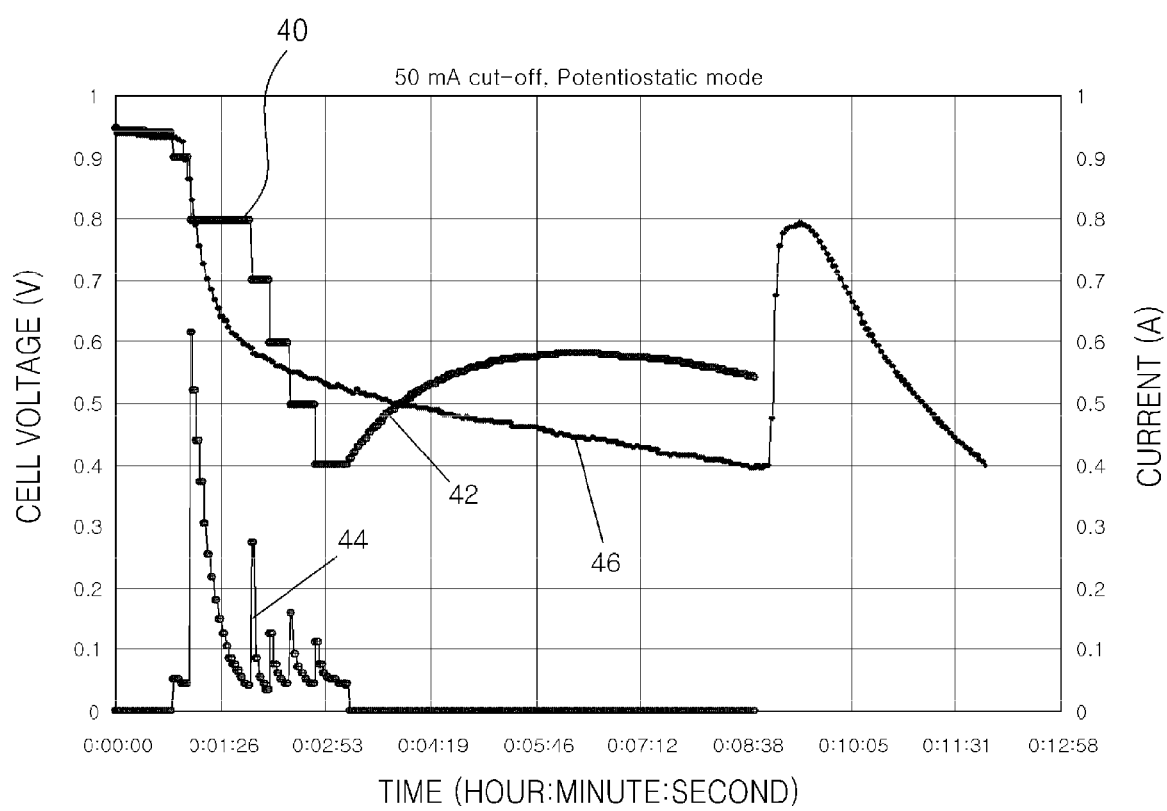
FIG. 5 is a graph showing voltage and current variations with respect to time when the method of removing residual oxygen in a fuel cell stack shown in FIG. 1 is applied according to an embodiment of the inventive concept.
Figure 6:
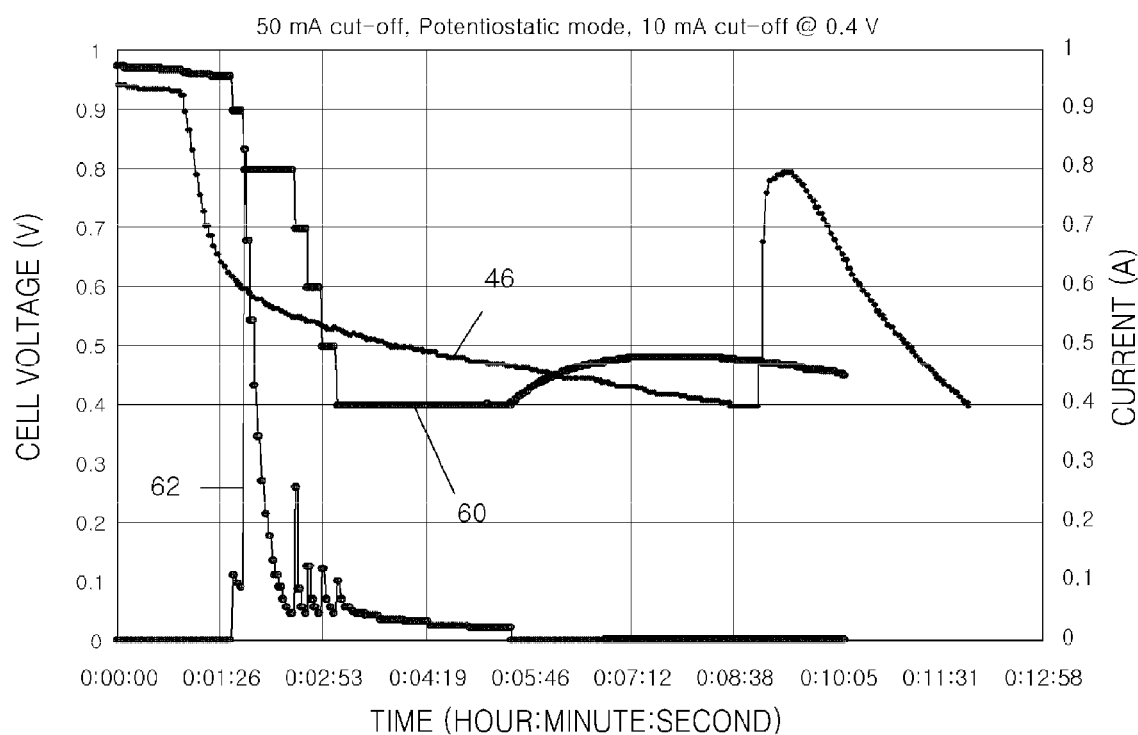
FIG. 6 is a graph showing voltage and current variations with respect to time when the method of removing residual oxygen in a fuel cell stack shown in FIG. 2 is applied according to another embodiment of the inventive concept.

FIGS. 5 and 6 are graphs showing voltage and current variations with respect to time when the residual oxygen in the fuel cell stack was removed by applying a constant voltage to the fuel cell stack in an idle mode. FIG. 5 is a graph showing voltage and current variations with respect to time according to the method described with reference to FIG. 2. In this regard, a voltage was applied to the fuel cell stack by reducing the voltage from 0.9 V to 0.4 V by 0.1 V. The cut-off current with regard to each voltage applied to the fuel cell stack, i.e., a set current Io, was 50 mA.

The first curve 40 shows variations of the voltage applied to the fuel cell stack. The second curve 44 shows variations of a current measured in the fuel cell stack as a function of the voltage applied to the fuel cell stack. The first part 42 of the first curve 40 represents the part where the voltage of the fuel cell stack rose when the voltage was not applied to the fuel cell stack after a voltage of 0.4 V was applied to the fuel cell stack, i.e., when the constant voltage load was removed. Referring to FIG. 5, the observed current 44 was due to oxygen reduction since the voltage applied to the fuel cell stack was reduced, and the current was reduced according to the diffusion resistance caused by the gradual depletion of oxygen in the fuel cell stack.

In comparison between the first curve 40 and the third curve 46, the time taken for the cell voltage of the fuel cell stack to reach 0.4V by using a conventional nitrogen purging method was two times longer than the method of removing the residual oxygen according to the embodiments. As shown in the first part 42 of the first curve 40, when the constant voltage load was removed, since the voltage of the fuel cell stack rose less than 0.2 V, the open circuit voltage (OCV) of the fuel cell stack did not reach 0.6 V. When the constant voltage load was removed, the voltage of the fuel cell stack rose since the cell voltage of the fuel cell stack reduced by the diffusion resistance was restored.

Meanwhile, when the residual oxygen was removed by using the conventional nitrogen purging method and then conventional nitrogen purging was stopped, the voltage of the fuel cell stack rose 0.4 V and thus the OCV thereof was 0.8 V. Since the higher cell voltage of the fuel cell stack leads to easier corrosion of the carbon support of a cathode, the method of removing the residual oxygen by the conventional nitrogen purging method may more easily cause cell deterioration than this embodiment of the inventive concept.

FIG. 6 is a graph showing voltage and current variations with respect to time according to the method described with reference to FIG. 3. Referring to FIG. 6, the first and second curves 60 and 62 show the same result as shown in FIG. 5 up until a voltage of 0.5 V was applied to the fuel cell stack. After the constant voltage applied to the fuel cell stack was adjusted to 0.4 V, the set current value Io, i.e., the cut-off current value, was adjusted from about 50 mA to about 10 mA. Thus, a greater amount of the residual oxygen is removed from the fuel cell stack. Then the constant voltage load was removed, since the voltage of the fuel cell stack rose less than 0.1 V, and the OCV of the fuel cell stack was maintained below 0.5 V.

The method of removing the residual oxygen in the fuel cell stack described with reference to FIGS. 5 and 6 reduces the time necessary for removing the residual oxygen, removes a great amount of the residual oxygen, and prevents a rise in the OCV of the fuel cell stack all compared to the method of removing the residual oxygen by nitrogen purging.

Figure 7:
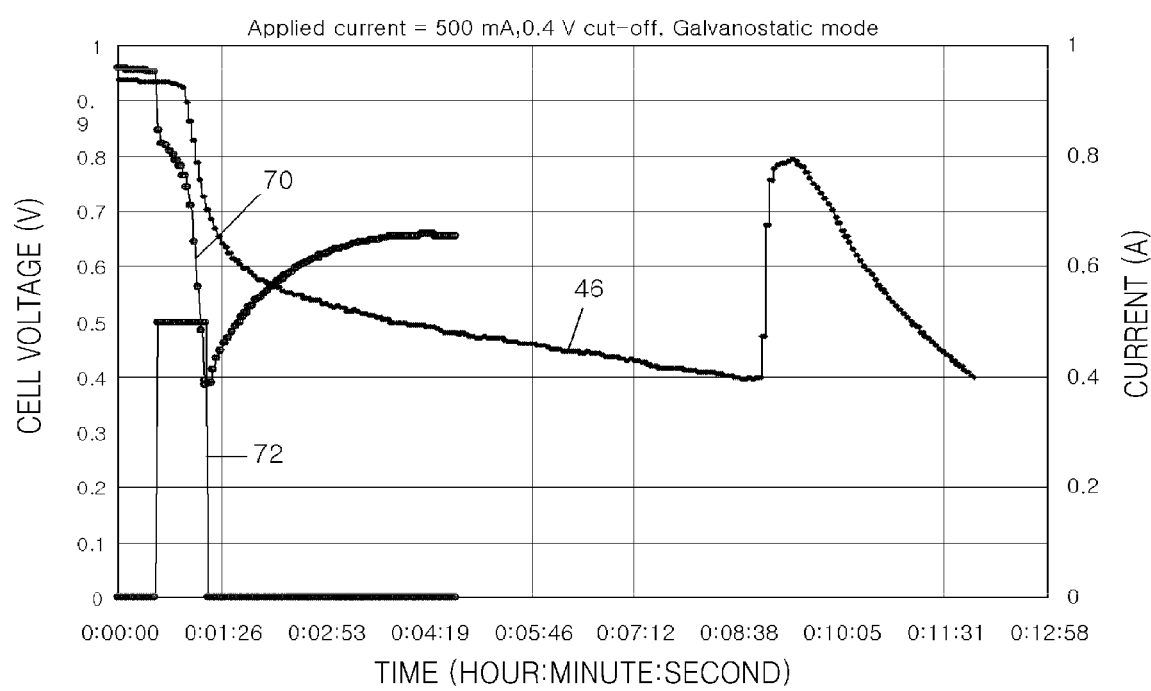
FIGS. 7 and 8 are graphs showing voltage and current variations with respect to time when the method of removing residual oxygen in a fuel cell stack shown in FIG. 3 is applied and different current values with regard to load are applied according to another embodiment of the inventive concept.
Figure 8:
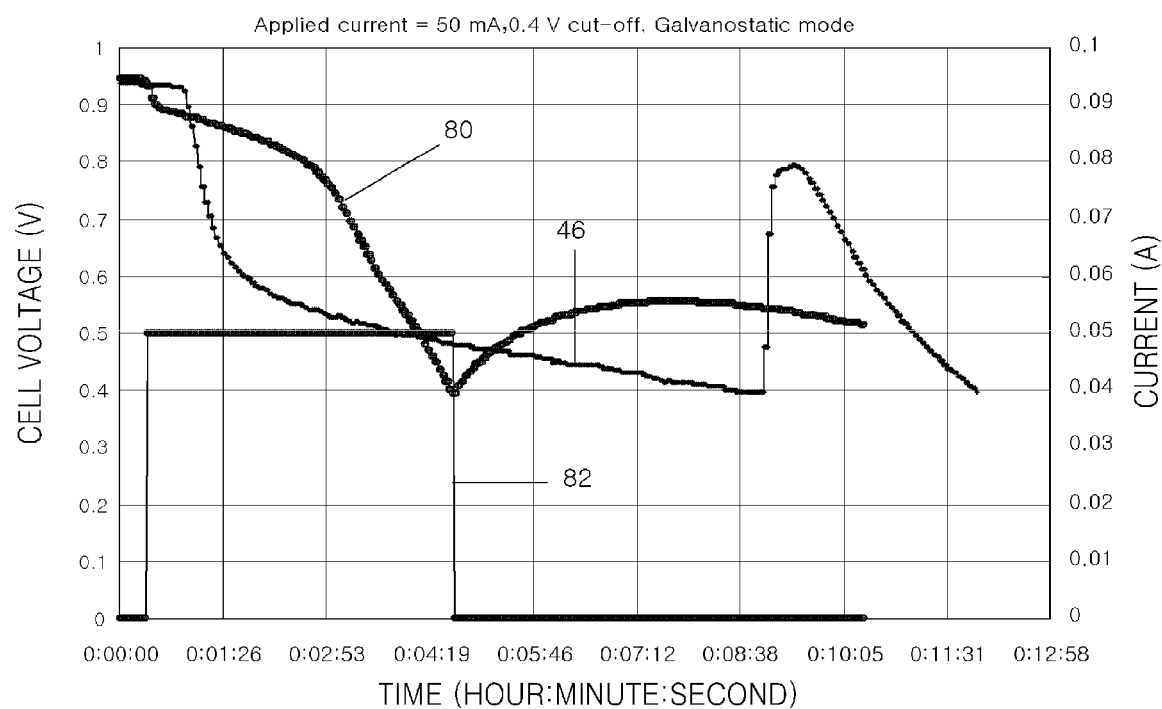

FIGS. 7 and 8 are graphs showing voltage and current variations with respect to time when a method of removing residual oxygen in the fuel cell stack shown in FIG. 4 was applied according to another embodiment of the inventive concept. Referring to FIG. 7, the graph shows the voltage variations of the fuel cell stack when the residual oxygen in the fuel cell stack was removed by establishing the set voltage Vo1 of the fuel cell stack, i.e., a cut-off voltage, as 0.4 V, and applying a constant current of 500 mA to an external load until the voltage of the fuel cell stack was the set voltage Vo1. A second curve 72 shows the constant current applied to the external load.

A first curve 70 shows that the time taken for the voltage of the fuel cell stack to reach the set voltage Vo1 was much shorter than for the method of removing the residual oxygen by conventional nitrogen purging. After the application of the constant current was stopped, the voltage 70 of the fuel cell stack exceeded 0.6 V. In this case, if the residual oxygen was removed by applying the voltage as shown in FIG. 2 or 3 after the voltage of the fuel cell stack reached the set voltage Vo1, cell purging time, i.e., time for removing the residual oxygen, was reduced, and cell damage due to any side reaction is prevented.

The graph shown in FIG. 8 shows the voltage variations of the fuel cell stack when the residual oxygen in the fuel cell stack was removed with the same conditions as shown in FIG. 7, except that a constant current of 50 mA was applied to the external load. A second curve 82 shows the constant current applied to the external load.

The first curve 80 shows that the time taken for the voltage of the fuel cell stack to reach the set voltage Vo1 was much shorter than the method of removing the residual oxygen by conventional nitrogen purging, and the voltage of the fuel cell stack did not exceed 0.6 V after the application of the constant current was stopped. If the residual oxygen was removed by applying the voltage as shown in FIG. 2 or 3 after the voltage of the fuel cell stack reached the set voltage Vo1, the time for removing the residual oxygen was reduced, and cell damage due to any side reaction is prevented.

The constant current described with reference to FIGS. 7 and 8 may be an on/off pulsating current. The pulsating current may be used to proceed with a reaction for removing the residual oxygen within a range that does not reach a limiting current density, thereby preventing cell deterioration due to any side reaction.

The methods of removing residual oxygen in a fuel cell stack according to the inventive concept of these embodiments do not use conventional nitrogen purging, thereby reducing the size of a fuel cell system. The methods apply a voltage or a current to the fuel cell stack, which removes residual oxygen in micro-pores of an electrode, instead of removal by nitrogen purging, thereby preventing cell deterioration and reducing the time necessary for removing the residual oxygen, i.e., purging time.

Also, since the fuel cell stack does not produce a negative pressure less than atmospheric pressure, air is not introduced into the fuel cell stack from the outside while residual oxygen is removed, thereby increasing removal efficiency of the residual oxygen. Air is not introduced into the fuel cell stack from the outside in an idle mode after the residual oxygen is removed, thereby effectively preventing deterioration of the fuel cell stack. The OCV of the fuel cell stack is also reduced, which prevents a side reaction, and thus corrosion and catalyst conglomeration of the carbon support of a cathode is prevented, thereby increasing durability of the fuel cell stack.

It should be understood that the embodiments described herein should be considered in a descriptive sense only and not for purposes of limitation. Descriptions of features or aspects within each embodiment should typically be considered as available for other similar features or aspects in other embodiments. For example, after residual oxygen in a fuel cell stack is removed by applying a voltage to the fuel cell stack, the method of removing the residual oxygen described with reference to FIG. 2 or 3 may further include applying a voltage corresponding to the OCV of the fuel cell stack. The residual oxygen may be removed by using a method that is not described among methods of removing the residual oxygen by applying the voltage to the fuel cell stack and a constant current to a load. Further, the inner pressure of a cathode may be maintained higher than 2 atm.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A method of removing a residual oxygen in a fuel cell stack when operation of the fuel cell stack is stopped, the method comprising:
   making pressure in a cathode of the fuel cell stack higher than pressure outside of the cathode by blocking air flow out of the cathode; comparing the pressure in the cathode with a set pressure higher than the pressure outside the cathode; supplying air to the cathode until the pressure in the cathode is the same as or is higher than the set pressure; and maintaining airtight sealing of the cathode of the fuel cell stack;
   removing a residual oxygen in the fuel cell stack while the pressure in the cathode is higher; and
   stopping supplying fuel to the fuel cell stack.

2. The method of claim 1, wherein the blocking of the air flow further comprises shutting off an inlet valve of the cathode.

3. The method of claim 1, further comprising:
   shutting off an inlet valve of the cathode when the pressure in the cathode is the same as or is higher than the set pressure; and
   stopping the supply of air to the fuel cell stack.

4. The method of claim 1, wherein the set pressure is maintained higher than atmospheric pressure.

5. The method of claim 1, wherein the removing of the residual oxygen in the fuel cell stack further comprises:
   applying a voltage to the fuel cell stack;
   measuring a current value in the fuel cell stack to which the voltage is applied to determine a measured current value;
   comparing the measured current value with a set current value; and
   applying the voltage to the fuel cell stack until the measured current value is the same as or is less than the set current value.

6. The method of claim 5, further comprising:
   comparing the voltage applied to the fuel cell stack with a set voltage after applying the voltage to the fuel cell stack until the measured current value is less than the set current value; and
   adjusting the voltage applied to the fuel cell stack until the voltage applied to the fuel cell stack is the same as or is less than the set voltage.

7. The method of claim 6, wherein the application of the voltage to the fuel cell stack is stopped when the voltage applied to the fuel cell stack is the same as or is less than the set voltage.

8. The method of claim 6, further comprising:
   adjusting the set current value when the adjusted voltage is the same as or is less than the set voltage;
   comparing the measured current value with the adjusted set current value; and
   when the measured current value is the same as or is less than the adjusted set current value, stopping the application of the voltage to the fuel cell stack.

9. The method of claim 8, wherein the adjusted set current value is less than the set current value before being adjusted.

10. The method of claim 6, wherein, when the adjusted voltage is the same as or is less than the set voltage, applying the adjusted voltage to the fuel cell stack longer than applying a different voltage to the fuel cell stack.

11. The method of claim 1, wherein the stopping of supplying fuel into the fuel cell stack further comprises shutting off inlet and outlet valves of an anode of the fuel cell stack.

12. The method of claim 1, further comprising completing the removal of the residual oxygen in the fuel cell stack, wherein:
   when the removal of the residual oxygen in the fuel cell stack is started, the pressure in the cathode of the fuel cell stack is a set pressure higher than an atmospheric pressure, and
   when the removal of the residual oxygen in the fuel cell stack is completed, the pressure in the cathode of the fuel cell stack is lower than the set pressure and becomes atmospheric pressure or more.

13. The method of claim 1, wherein, when the removal of the residual oxygen is started, the pressure in the cathode of the fuel cell stack is maintained at about 1.27 to about 2 atm.

14. The method of claim 1, wherein the removing of the residual oxygen in the fuel cell stack further comprises:
   connecting the fuel cell stack to a load and applying a current to the load;
   measuring the voltage of the fuel cell stack;
   comparing the measured voltage with the set voltage; and
   stopping applying the current to the load when the measured voltage is the same as or is less than the set voltage.

15. The method of claim 14, further comprising:
   measuring the voltage of the fuel cell stack again after stopping the application of the current to the load to obtain a second measured voltage;
   comparing the second measured voltage with the set voltage; and
   when the second measured voltage is greater than the set voltage, removing the residual oxygen by applying the voltage to the fuel cell stack.

16. The method of claim 14, wherein the current is a pulsating current.

17. The method of claim 5, wherein the voltage is applied by using a DC-DC converter.

18. The method of claim 15, wherein the removing of the residual oxygen by applying the voltage to the fuel cell stack further comprises:
   applying a voltage to the fuel cell stack;
   measuring the current voltage of the fuel cell stack according to the voltage application;
   comparing the measured current value with a set current value; and
   applying the voltage to the fuel cell stack until the measured current value is the same as or is less than the set current value.

19. The method of claim 18, further comprising:
comparing the voltage applied to the stack with the set voltage after application of the voltage to the fuel cell stack until the measured current value is the same as or is less than the set current value; and
adjusting the voltage applied to the fuel cell stack until the voltage applied to the fuel cell stack is the same as or is less than the set voltage.

20. The method of claim 15, wherein the application of the current to the load is stopped before the measured voltage reaches the set voltage, and the residual oxygen is removed by applying the voltage to the fuel cell stack.

* * * * *